(12) United States Patent
Dion

(10) Patent No.: US 9,546,429 B1
(45) Date of Patent: Jan. 17, 2017

(54) MULTI-STRAND ELECTRODE AND METHOD OF MAKING

(71) Applicant: Arbsource LLC, Phoenix, AZ (US)

(72) Inventor: Matthew Dion, Phoenix, AZ (US)

(73) Assignee: Microrganic Technologies Inc, Castleton-on-Hudson, NY (US)

( * ) Notice: Subject to any disclaimer, the term of this patent is extended or adjusted under 35 U.S.C. 154(b) by 222 days.

(21) Appl. No.: 14/250,509

(22) Filed: Apr. 11, 2014

Related U.S. Application Data

(60) Provisional application No. 61/811,159, filed on Apr. 12, 2013.

(51) Int. Cl.
  *B21F 15/04* (2006.01)
  *C25B 11/02* (2006.01)
  *H01M 4/86* (2006.01)
  *H01M 4/88* (2006.01)

(52) U.S. Cl.
  CPC ............... *C25B 11/02* (2013.01); *H01M 4/86* (2013.01); *H01M 4/88* (2013.01); *B21F 15/04* (2013.01)

(58) Field of Classification Search
  CPC ............ B21F 1/04; B21F 7/00; B21F 15/04; B21F 15/06; B21F 27/121; B21F 27/122; H01M 4/88; H01M 4/8875; C25B 11/02; H01J 19/02; H01J 2893/0025
  USPC ................. 140/71.5, 102, 149; 429/401, 209
  See application file for complete search history.

(56) References Cited

U.S. PATENT DOCUMENTS

| | | | |
|---|---|---|---|
| 1,447,657 A | | 3/1923 | Roesel et al. |
| 2,352,651 A | * | 7/1944 | Meston ............ B03C 3/41 |
| | | | 140/71.5 |
| 3,850,697 A | * | 11/1974 | Brown ............ C25B 11/02 |
| | | | 29/623.1 |
| 4,347,873 A | * | 9/1982 | Caras ............ H01J 9/148 |
| | | | 140/71.5 |
| 4,740,287 A | | 4/1988 | Cawlfield |
| 5,427,871 A | | 6/1995 | Garshol et al. |
| 5,487,821 A | | 1/1996 | Sieck et al. |
| 6,573,008 B1 | | 6/2003 | Hasvold |
| 7,695,834 B1 | | 4/2010 | Borole |
| 8,012,616 B2 | | 9/2011 | Tender |

(Continued)

FOREIGN PATENT DOCUMENTS

| | | |
|---|---|---|
| CN | 101702440 A | 5/2010 |
| KR | 20120071571 A | 7/2012 |
| WO | 2012146897 A1 | 11/2012 |

*Primary Examiner* — Edward Tolan
(74) *Attorney, Agent, or Firm* — Invention To Patent Services; Alex Hobson

(57) ABSTRACT

An electrode having a plurality of connected strands retained by a current collector is described. A connected strand has first and second ends that are retained by a current collector, and may be retained at different locations along the length of the current collector. A connected strand retained by the current collector in substantially the same location along the current collector, is a looped strand. A connected strand provides two paths for current to move through the strand to the current collector and may therefore provide lower resistance than a free strand having only one end coupled to the current collector. Furthermore, a connected may move less as a function of fluid forces and retain more bio-film in turbulent conditions than free strands. Finally, a connected strand has no free extended end and therefore is less likely to puncture through an ion conductive membrane.

3 Claims, 17 Drawing Sheets

(56) References Cited

U.S. PATENT DOCUMENTS

| | | |
|---|---|---|
| 8,124,259 B2 | 2/2012 | Rinzler |
| 8,241,798 B1 | 8/2012 | Salguero et al. |
| 8,307,858 B2 * | 11/2012 | Donahoe .................. A01G 5/04 140/102 |
| 2004/0188245 A1 * | 9/2004 | Katayama ................. C25B 9/04 204/252 |
| 2006/0147763 A1 | 7/2006 | Angenent et al. |
| 2008/0220292 A1 | 9/2008 | Rabaey et al. |
| 2008/0292912 A1 * | 11/2008 | Logan .................. H01M 4/8878 429/2 |
| 2010/0021776 A1 | 1/2010 | Dougherty et al. |
| 2010/0151279 A1 | 6/2010 | Logan et al. |
| 2010/0330434 A1 * | 12/2010 | Swift ...................... H01M 4/90 429/401 |
| 2011/0229742 A1 | 9/2011 | Shechter et al. |
| 2011/0236769 A1 | 9/2011 | Xie et al. |

* cited by examiner

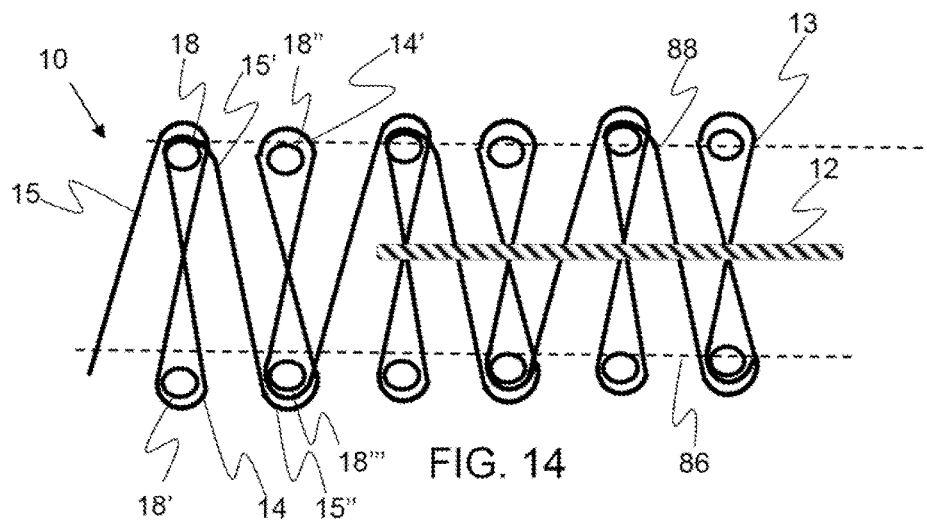
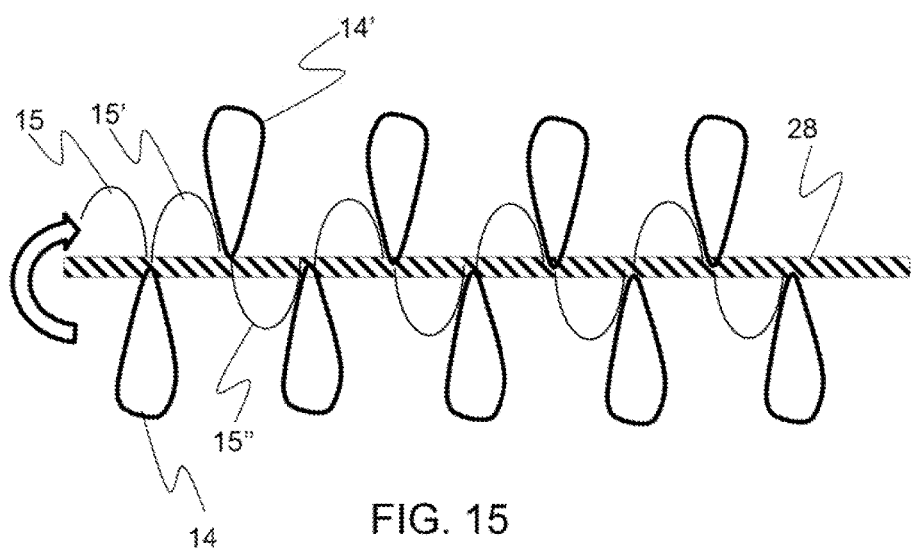

MULTI-STRAND ELECTRODE AND METHOD OF MAKING

CROSS REFERENCE TO RELATED APPLICATIONS

This application claims the benefit of U.S. provisional patent application No. 61/811,159 filed on Apr. 12, 2013; the entirety of which is incorporated herein by reference.

BACKGROUND OF THE INVENTION

Field of the Invention

The present invention relates to electrodes comprising a plurality of connected strands and particularly anodes for microbial electrochemical cells.

Background

Electrodes comprising free strands, such as electrodes for microbial electrochemical cells comprising strands of carbon fiber bundles, have a number of limitations and shortcomings. First, these electrodes comprise individual free strands, or strands that have one end retained by a current collector and a free end that extends from the current collector. These free ends can protrude into an ion conducting membrane and cause a short in a microbial fuel cell, for example. In addition, the loose strands freely move in liquid streams and more easily dislodge bio-film and reduce the effectiveness of the cell. Furthermore, the electrical conductivity of the individual strands having a free end may be limited and the contact resistance of the strand with the current collector may be higher than desired.

Wastewater from industrial and domestic sources typically contains dissolved organics that need to be removed before the water can be reused. Traditionally, this has been accomplished by aerobic biological treatment. However, this treatment method requires aeration, which consumes large amounts of energy and thus it is an energy intensive process.

Although wastewater is typically thought of as a nuisance, it is being increasingly recognized as a resource for the production of energy, fuels, and chemicals. While anaerobic digestion has already developed into a mature technology for conversion of wastewater organics to the energetic gas methane ($CH_4$), not all of the energy extracted from wastewater is available for use, as there are significant losses associated with the conversion of methane to easily usable energy forms such as electricity.

Recently, a new technology, referred to as Microbial Electrochemical Cells (MXCs), has gained significant attention with respect to sustainable wastewater treatment. This technology relies on specialized bacteria called anode-respiring bacteria (ARB) that oxidize wastewater organics, and transfer electrons to an anode. Microbial Electrochemical Cells can be configured as electricity-generating Microbial Fuel Cells (MFCs) or hydrogen-generating Microbial Electrolysis Cells (MECs). In a Microbial Electrolysis Cell, electrons harvested on the anode side of the reactors move through a circuit to a cathode, where water ($H_2O$) is reduced to produce hydrogen ($H_2$) gas by applying additional voltage between the anode/cathode bridge. The MEC is especially attractive since the produced $H_2$ gas has higher energetic value than $CH_4$, and can be readily converted to useful electrical power using chemical fuel cells, and is a major feedstock to the chemical and petrochemical industries. Other chemical products may be produced, such as caustic soda (NaOH), which is useful in the manufacture of pulp and paper, textiles, soaps and detergents. In electricity-producing Microbial Fuel Cells, the mode of operation is different, in that electrons from the breakdown of organic pollutants on the cathode are directly used to power a load between anode and cathode, with the additional voltage derived from the redox reaction of oxygen formation into water.

SUMMARY OF THE INVENTION

The invention is directed to an electrode comprising a plurality of connected strands retained by a current collector. A connected strand has a first and second end that are retained by a current collector, and may be retained at different locations along the length of the current collector. In an exemplary embodiment, a connected strand is a looped strand having first and second loop ends retained by the current collector in substantially the same location along the current collector, whereby the first and second loop ends are retained by the current collector no more than about 3 mm apart, no more than about 2 mm apart, or no more than about 1 mm apart. A connected strand provides two paths for current to move through the strand to the current collector and comprises more contact surface with the current collector and therefore may provide lower resistance than a free strand. Furthermore, a connected or looped strand may move less as a function of fluid forces and thereby retain more bio-film in turbulent conditions than free strands having a free extended end. In the event that a strand breaks, a connected strand will still be connected to the current collector on both ends, whereas a free strand will lose a portion of the strand. Finally, a connected strand has no free extended end and therefore is less likely to puncture through an ion conductive membrane.

Strands may comprise any suitable type of material including but not limited to, carbon, carbon fibers, carbon fiber bundles, metal, silver, gold, titanium, alloys, composites and the like. Strands may have any suitable shape and size and may comprise one or more portions, such as an outer strand portion and core that may comprise different materials. For example, a plurality of carbon fibers may form the outer strand portion around a core comprising metal. In an exemplary embodiment, a strand has a circular cross-sectional shape and consists of a plurality of carbon fibers configured in a bundle. A strand may have any suitable maximum cross-sectional dimension including no more than about 10 mm, no more than about 7 mm, no more than about 5 mm, no more than about 2 mm, no more than about 1 mm, and any range between and including the dimensions provided. In one embodiment, an electrode, as described herein, comprises a plurality of looped strands, wherein a first looped strand has a first maximum cross-sectional dimension and a second looped strand has a second maximum cross-section dimension, wherein the first maximum cross-sectional dimension is substantially greater than the second maximum cross-sectional dimension.

A current collector typically comprises two or more current collectors that are twisted together. During the twisting process, the electrode strands are captured in the twists and retained. In one embodiment, a current collector comprises one contiguous current collector having at least one bend, whereby the current collector extends up and back along the length of the electrode. In another embodiment, two or more distinct current collectors are configured along the length of the electrode. Any number of current collectors may be configured in an electrode as described herein. A current collector may comprise any suitable material or combination of materials including, but not limited to, metal, such as steel, cooper, gold, saver, titanium, alloys, composites and the like. Current collectors may have any suitable cross-sectional shape including, round, rectangular and the like. In an exemplary embodiment, a single continuous current collector extends up and back along the length of the electrode and has a round cross-sectional shape. In another exemplary embodiment, a current collector consists of metal selected from the group consisting of: steel, copper, gold, and titanium An electrode, as described herein, may comprise one or more strands, and these strands may have different cross-sectional shapes and/or dimensions, or may comprise different materials. In one embodiment, an electrode comprises a single contiguous strand formed into connected strands. In an alternative embodiment, an electrode as described herein comprises two or more strands.

An electrode, as described herein, may comprise any number of connected strands having a first and second ends retained by the current collector, thereby not having a free end extending from the current collector. For example, an electrode may comprise more than about five connected strands, more than about ten connected strands, more than about 25 connected strands, more than about 50 connected strands, more than about 100 connected strands, more than about 500 connected strands, more than about 1000 connected strands and any range between and including the numbers provided. In addition, connected strands may comprise any portion of looped strands. The connected strands may have any suitable captured, or loop length including, but not limited to, greater than about 5 mm, greater than about 2 cm, greater than about 4 cm, greater than about 10 cm, greater than about 20 cm and any range between and including the length values listed. In an exemplary embodiment, the looped strands of an electrode, as described herein, are all substantially the same length. In an alternative embodiment, an electrode comprises a plurality of looped strands wherein a first looped strand has a first loop length and a second looped strand has a second loop length, and wherein the first loop length is substantially greater than the second loop length.

In an exemplary embodiment, an electrode consists essentially of connected strands, whereby only strand terminations may have a free extended end, and these terminations are limited to the end of the strand portion of the electrode. In another embodiment, an electrode as described herein consists of connected strands and comprises no strands with a free end extending from the current collector. A connected strand may be a looped strand comprising a first and second looped ends that are retained by the current collector. Connected or looped strands may be configured in an alternating or opposing configuration as described herein. Any combination of connected strands or looped strands may be configured along the length of an electrode. Connected or looped strands may have any suitable length or offset distance from the current collector. In an exemplary embodiment, an electrode comprises looped strands that extend substantially perpendicularly from the current collector and are configured substantially uniformly along the current collector length. Substantially uniformly along the current collector length, means that the strands have a strand density along the length of the current collector that does not vary more than 20% along the length of the current collector.

An electrode, as described herein, may comprise double looped strands, whereby two loop strands have loop ends that are retained along the current collector in substantially the same location, such as not offset by more than 5 mm along the length of the current collector. In yet another embodiment, an electrode, as described herein, comprises integral double looped strands, whereby two loop strands have loop ends that are retained along the current collector in substantially the same location and consists of the same strand.

The electrode, as described herein, may have any suitable strand density including, but not limited to, greater than about 500 g/m$^2$, where the weight, in grams, is the strand weight of the multi-strand electrode and the area is planar area of the strand portion of the multi-strand electrode. The weight of the strands can be measure by removing the strands from the multi-strand electrode and weighing it. The planar electrode area is measure by compressing the multi-strand electrode and determining the coverage area of the strand portion of the electrode. For example, a multi-strand electrode may be compressed onto a piece of paper and the area of coverage of the strand portion of the electrode can be outlined. The area of the outlined area can then be determined. A multi-strand electrode, as described herein, may have a strand density greater than about 250 g/m2, greater than about 750 g/m2, greater than about 1000 g/m2 and any range between and including the values provided. The strand density may be substantially consistent along the length of the electrode or may vary.

A multi-strand electrode, as described herein may have a strand length density, or total length of all strands measure over a unit length of the electrode. A unit length of electrode, such as 1 cm for example, may be cut away from the multi-strand area of the electrode and the total length of strands within this unit length may be measure to determine the strand length density with the units of total strand length over length of electrode. A multi-strand electrode may have any suitable strand length density including, but not limited to, greater than about 25 cm/cm, greater than about 50 cm/cm, greater than about 75 cm/cm, greater than about 100 cm/cm, greater than about 150 cm/cm and any range between and including the strand length density values provided. The strand length density may be substantially consistent along the length of the electrode or may be vary. In one embodiment, the strand length density increases in value from a first end to a second end of the electrode.

The electrode, as described herein, may be configured as an anode in a microbial fuel cell, or a microbial electrolysis cell. The configuration of the electrode including the strand length density may be selected for optimum performance for the designated application.

The multi-strand electrode as described herein, may be made by any suitable process or combination of processes. In one embodiment, a multi-strand electrode, as described herein, is made by a process comprising the steps of: providing at least one current collector having a collector length; providing at least one strand; providing a peg assembly comprising a plurality of flexible pegs configured in at least two rows having a row separation space there between; configuring a first current collector between the two rows of pegs; wrapping at least one strand around the pegs whereby the first strand wraps around a peg on a first row and then extends across the separation space to wrap around a second peg on a second row; configuring a second current collector on-top of the wrapped strand: and twisting the first and second current collectors together to form a twisted current collector, whereby the wrapped strand is retained in the twist of the current collectors and pulls off the flexible pegs as the current collectors are twisted to produce a multi-strand electrode having a plurality of looped strands extending from the twisted current collector. The strand may be wrapped around the pegs to form one or more looped strands, or integral loop strands. In one embodiment, three or more peg rows may be configured in the peg assembly.

Two or more strands may be wrapped around the pegs in any suitable configuration. A double looped strand may be produced by the process described.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1:
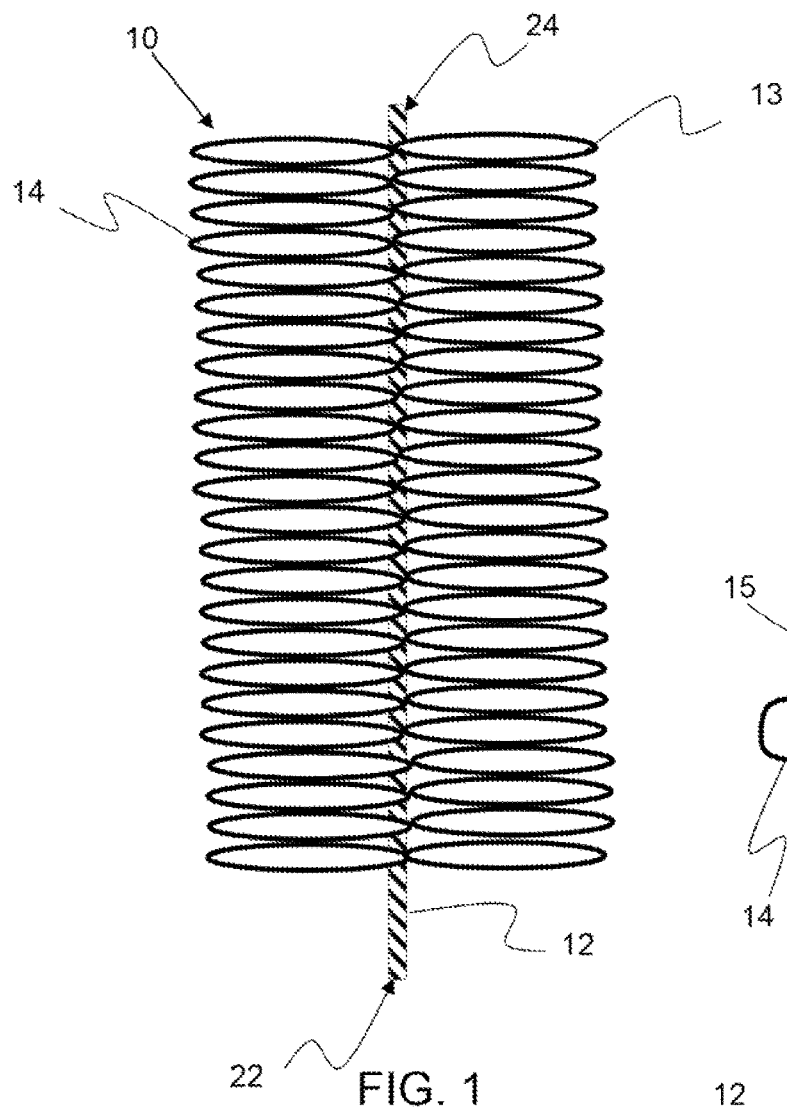

FIG. 1 shows a side view of an exemplary multi-looped electrode.

Figure 2:
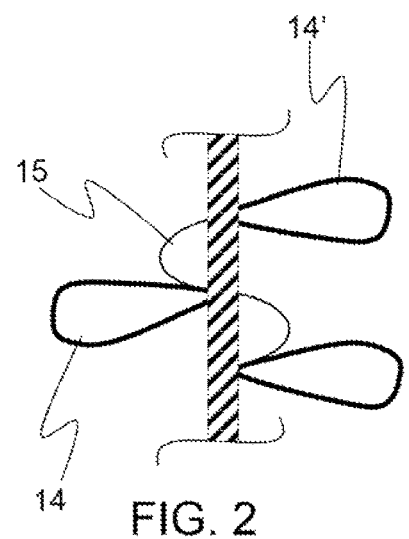

FIG. 2 shows a side view of a portion of an exemplary multi-looped electrode comprising connected strands between the looped strands.

Figure 3:
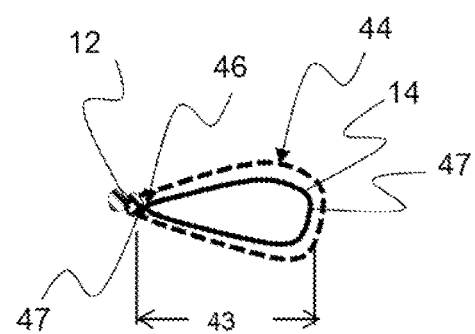

FIG. 3 shows a top-down view of an exemplary looped stand coupled to a current collector.

Figure 4:
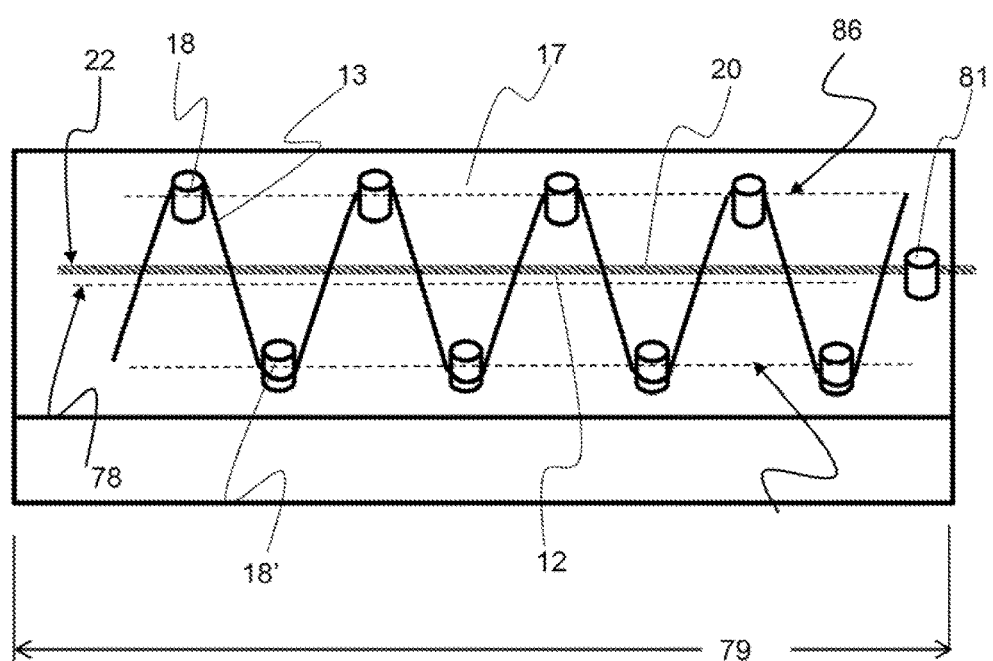

FIG. 4 shows an isometric side view of an exemplary peg board with a strand wrapped around the pegs.

Figure 5:
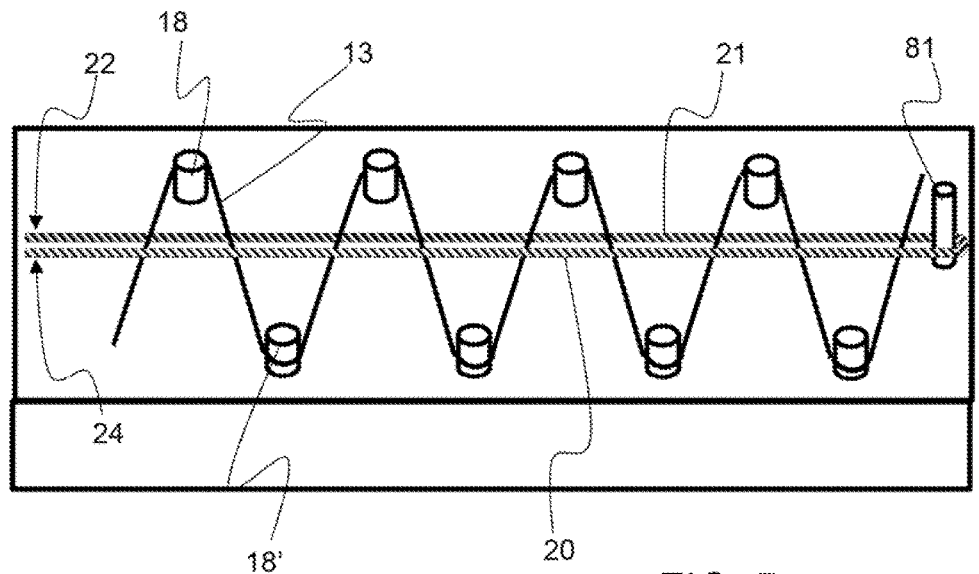

FIG. 5 shows an isometric side view of an exemplary peg board with a strand wrapped around the pegs and a current collector configured around a collector peg and extending back over the wrapped strands.

Figure 6:
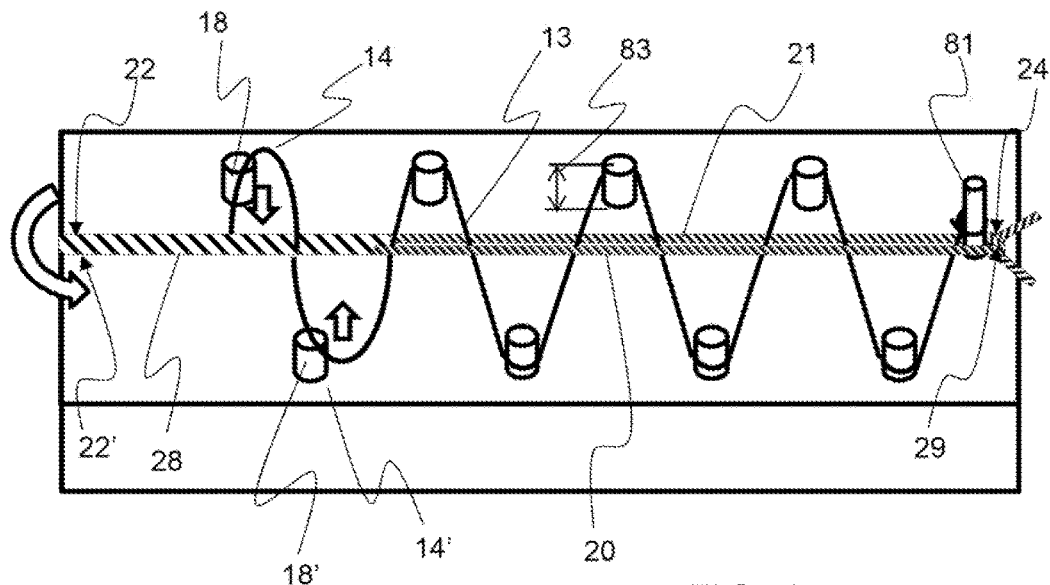

FIG. 6 shows an isometric side view of an exemplary peg board with a strand wrapped around the pegs and the current collectors being twisted to form connected strands.

Figure 7:
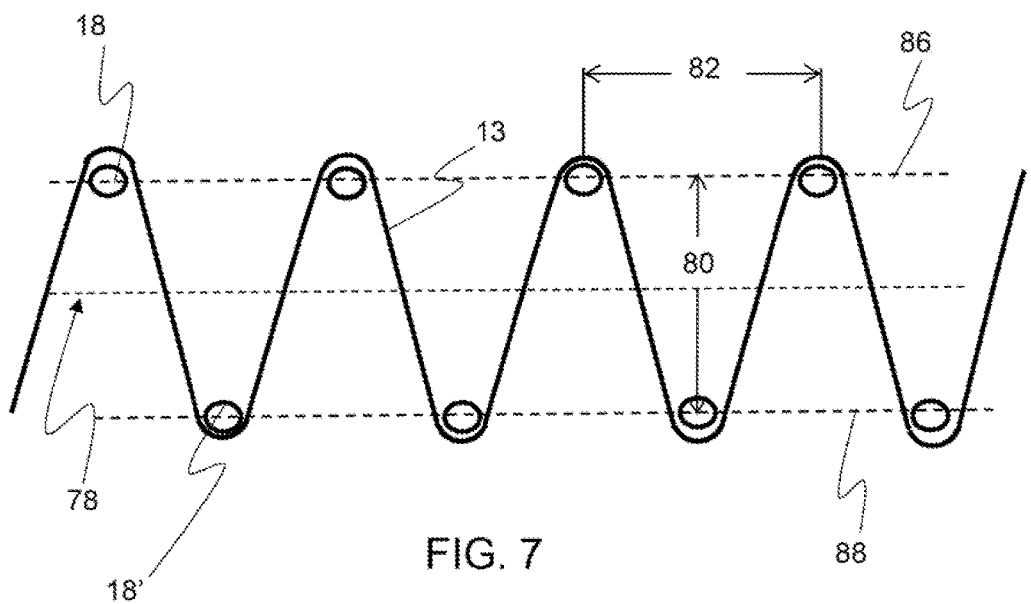

FIG. 7 shows a top-down view of a strand wrapped in a serpentine fashion around the pegs aligned in first and second rows.

Figures 8, 9:
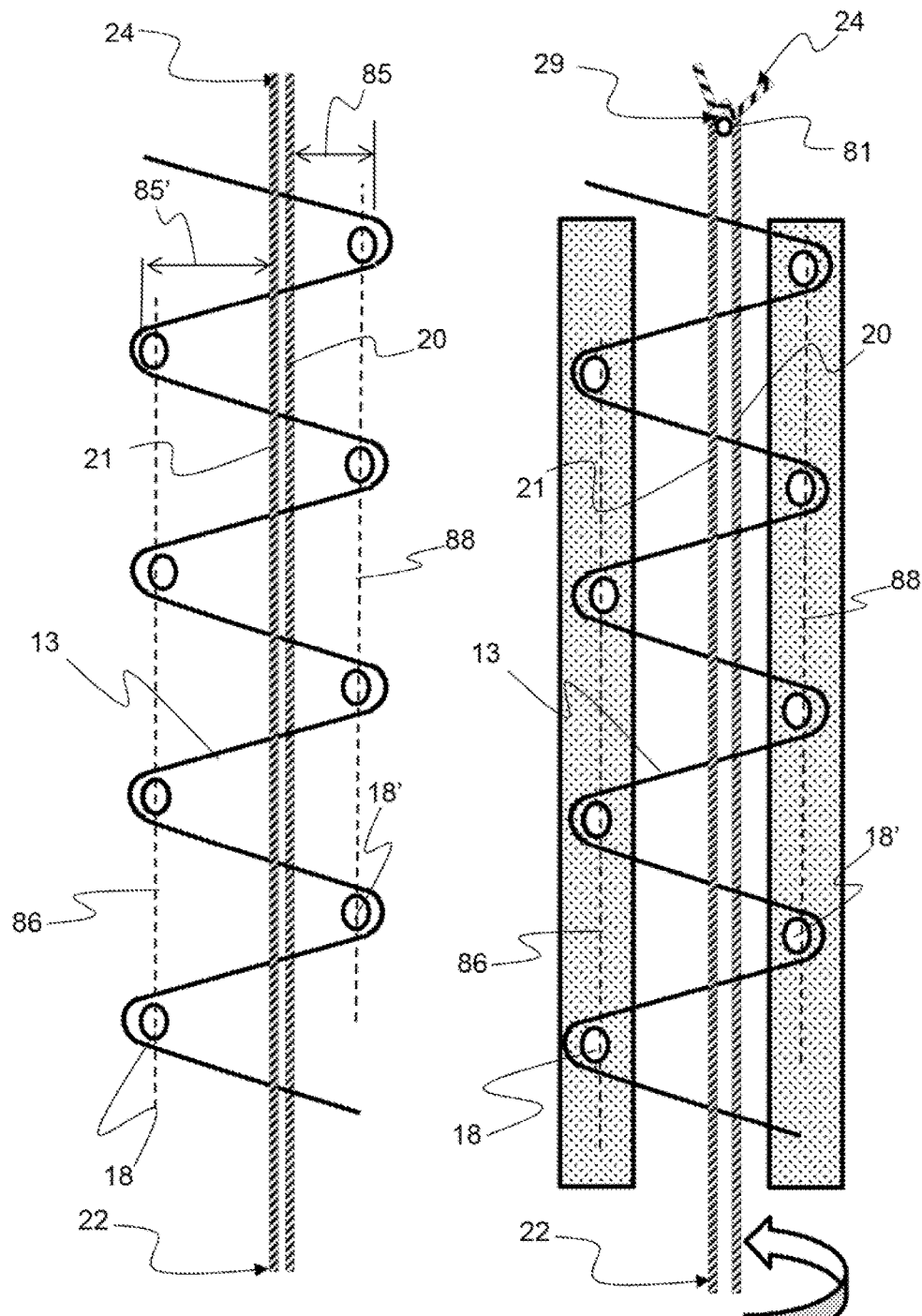

FIG. 8 shows a top-down view of a strand wrapped in a serpentine fashion around pegs and a first current collector configured under the strand and a second current collector configured over the strand.

FIG. 9 shows a top-down view of a strand wrapped in a serpentine fashion around the pegs and two current collectors fastened at the second end around collector peg.

Figure 10:
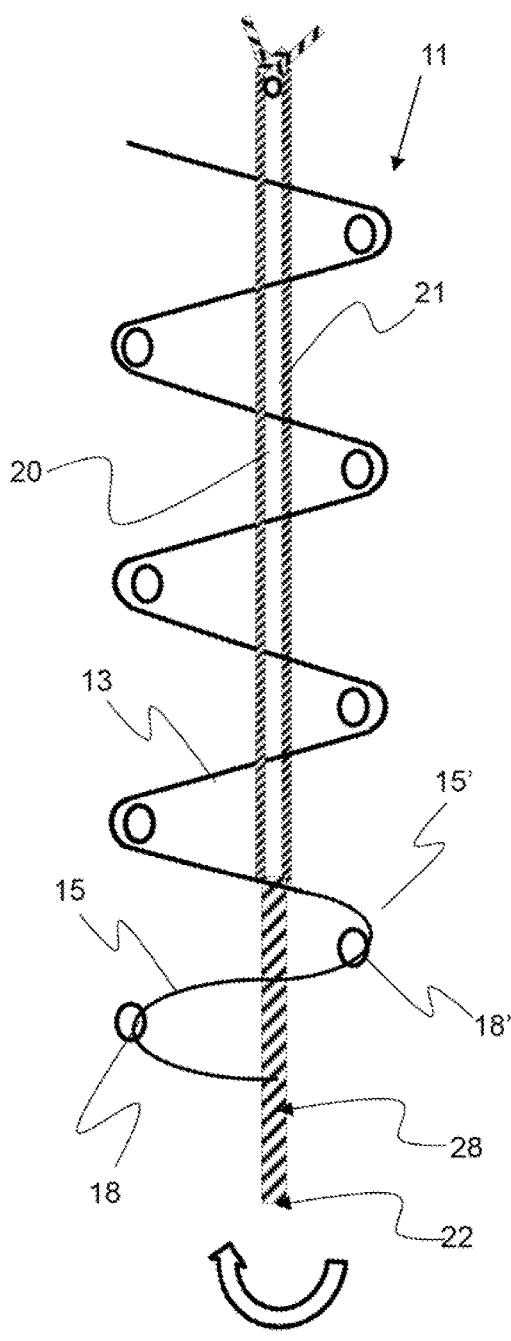

FIG. 10 shows a top-down view of an exemplary electrode having connected strands formed by the twisting of the individual current collectors.

Figure 11:
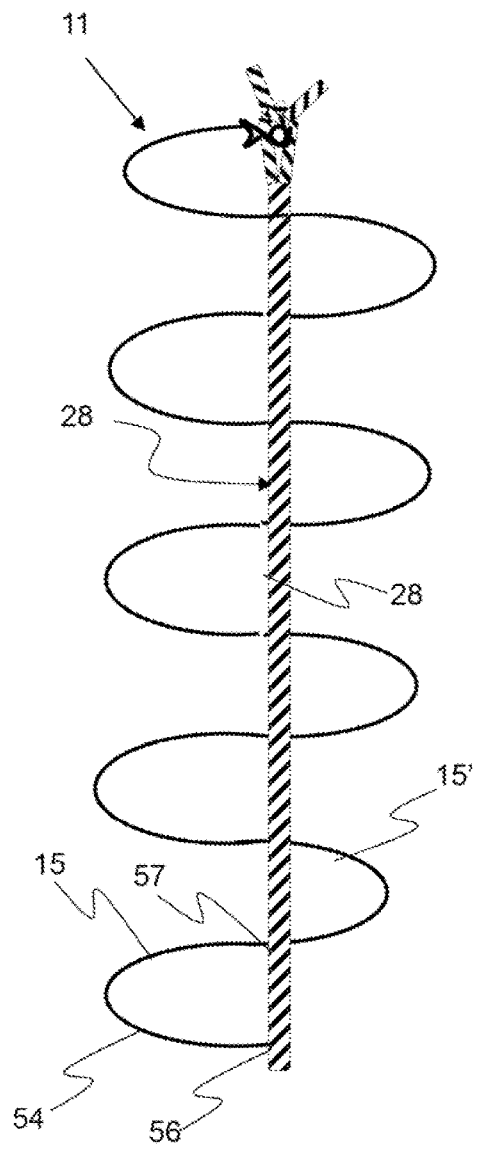

FIG. 11 shows a top-down view of an exemplary electrode comprising a plurality of connected strands.

Figure 12:
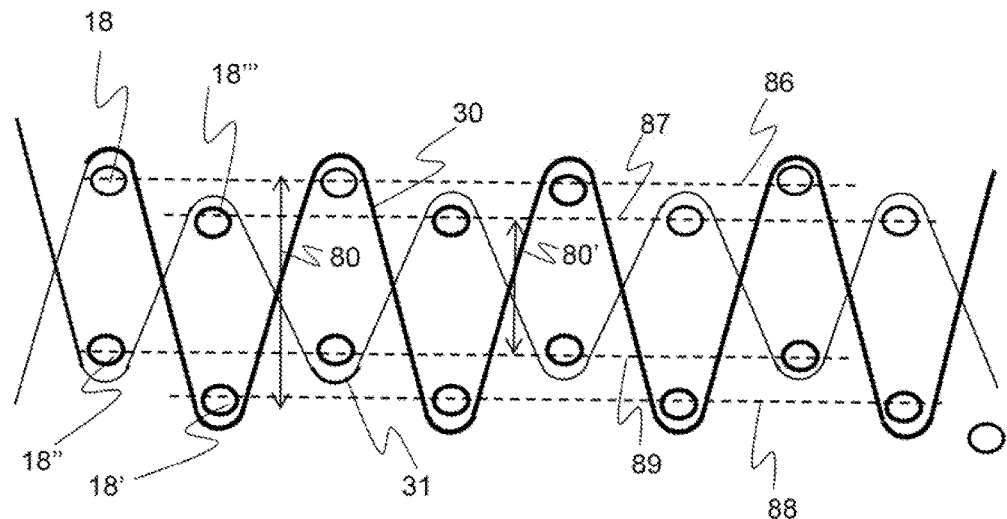

FIG. 12 shows a top-down view of a first strand wrapped around pegs in a first and second peg row and a second strand wrapped around pegs in a third and fourth row.

Figure 13:
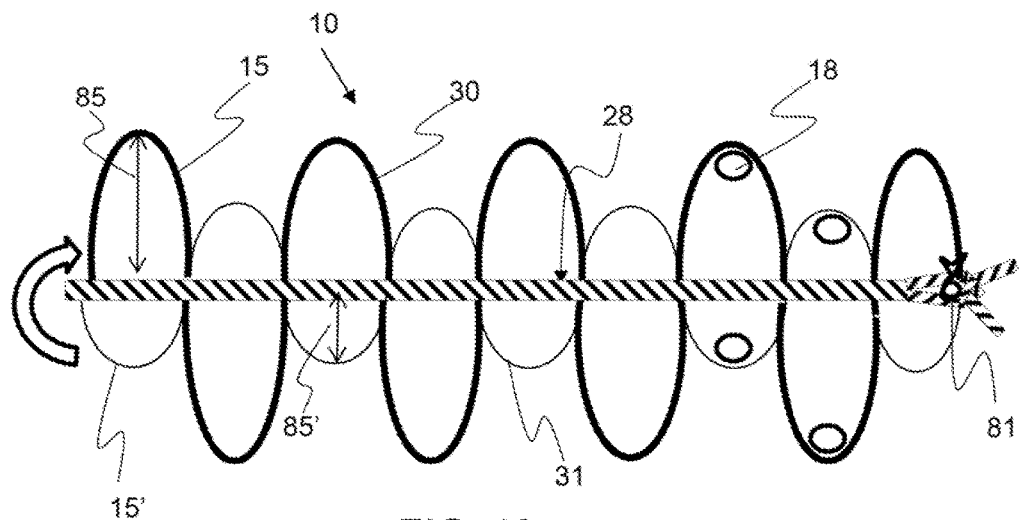

FIG. 13 shows a top-down view of the strands shown in FIG. 12 captured in a twisted current collector.

FIG. 14 shows a top-down view of a single strand wrapped around the pegs to form looped strands.

FIG. 15 shows a top-down view of the strands shown in FIG. 14 captured in a twisted current collector to form a plurality of looped strands.

Figure 16A:
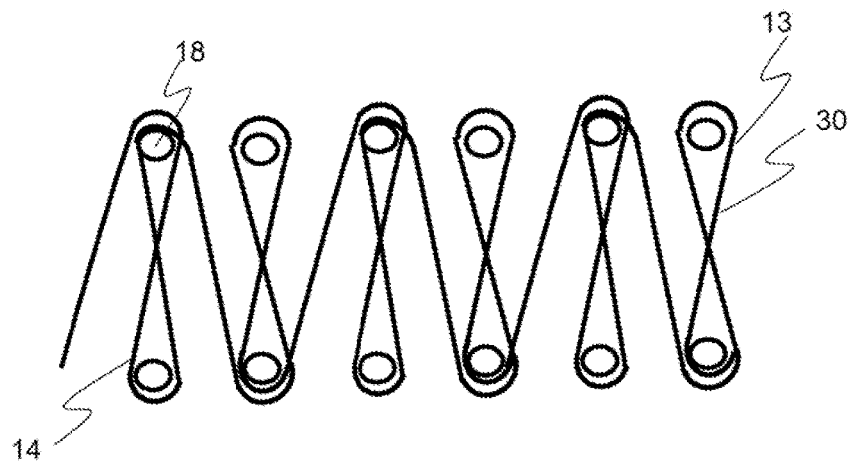

FIG. 16A shows a top-down view of a first strand wrapped around the pegs to form looped strands.

Figure 16B:
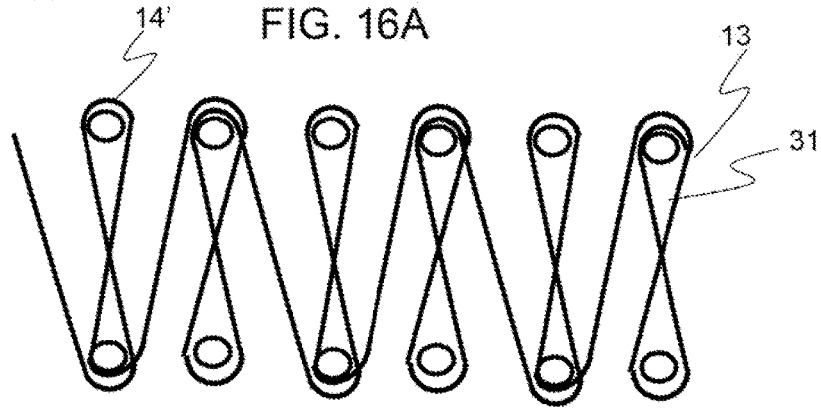

FIG. 16B shows a top-down view of a second strand wrapped around the pegs to form looped strands on the opposite pegs as shown in FIG. 16A.

Figure 16C:
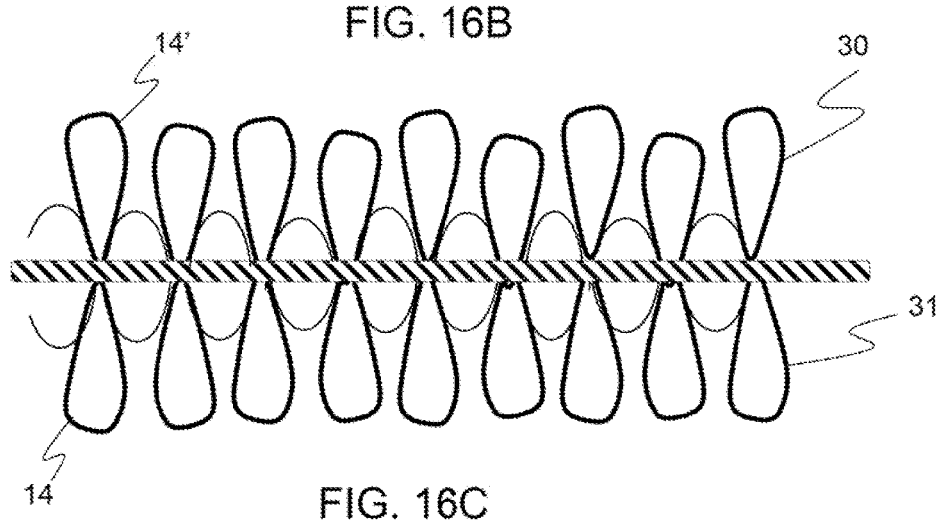

FIG. 16C shows a top-down view of the strands shown in FIGS. 16A and 16B captured in a twisted current collector to form a plurality of looped strands.

Figure 17:
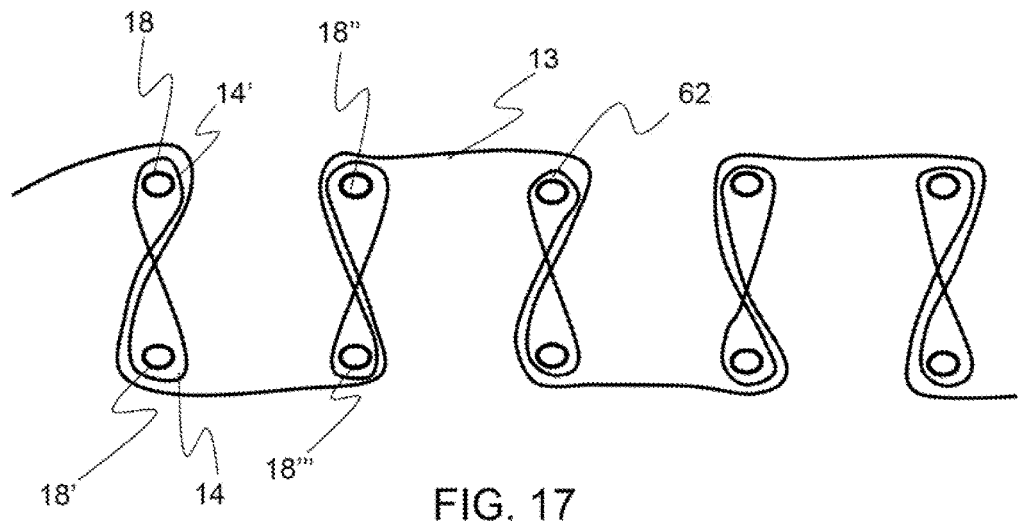

FIG. 17 shows a top-down view of a peg board with a strand wrapped at least partially around each peg two times.

Figure 18:
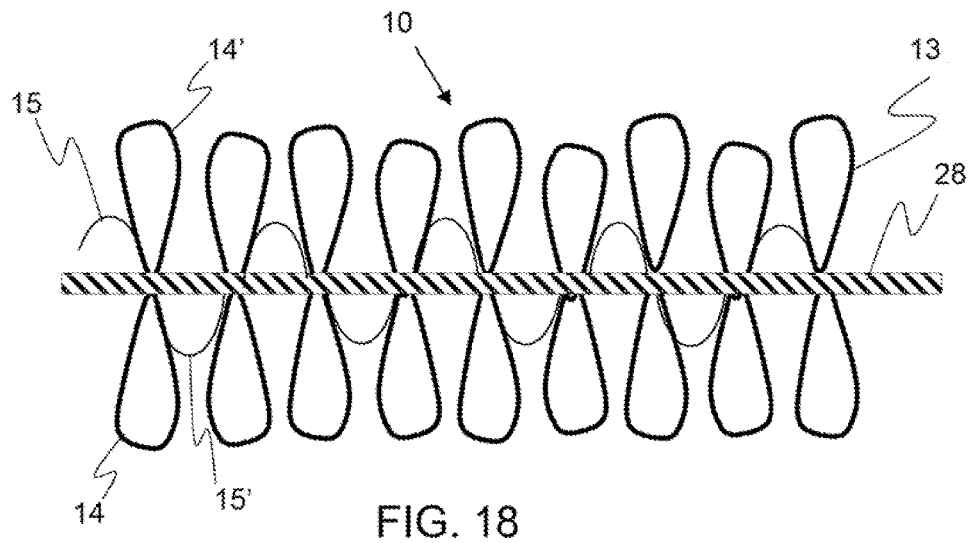

FIG. 18 shows a side view of a multi-looped electrode made by the peg wrapping configuration shown in FIG. 17 having first and second looped strands.

Figure 19:
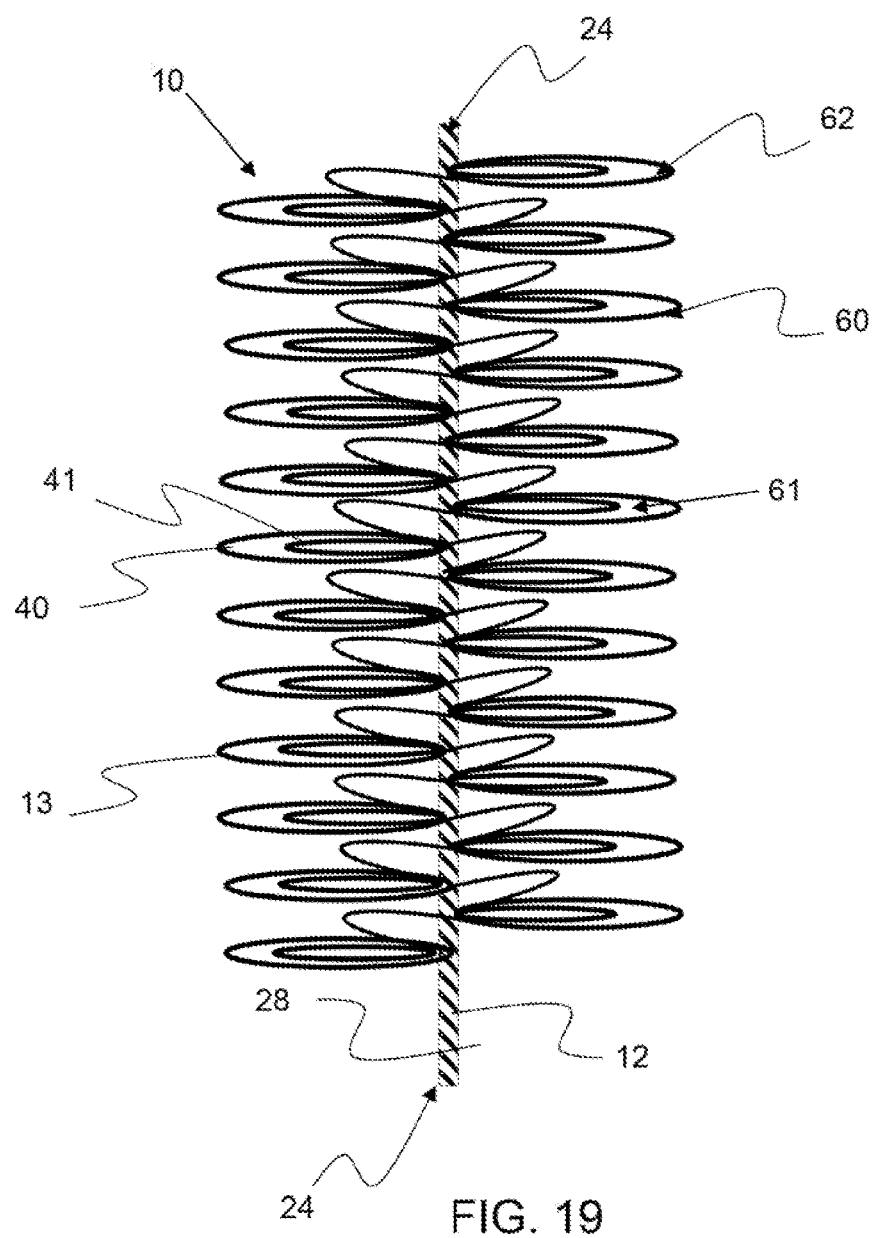

FIG. 19 shows a side view of a multi-looped electrode having integral double looped strands.

Figure 20A:
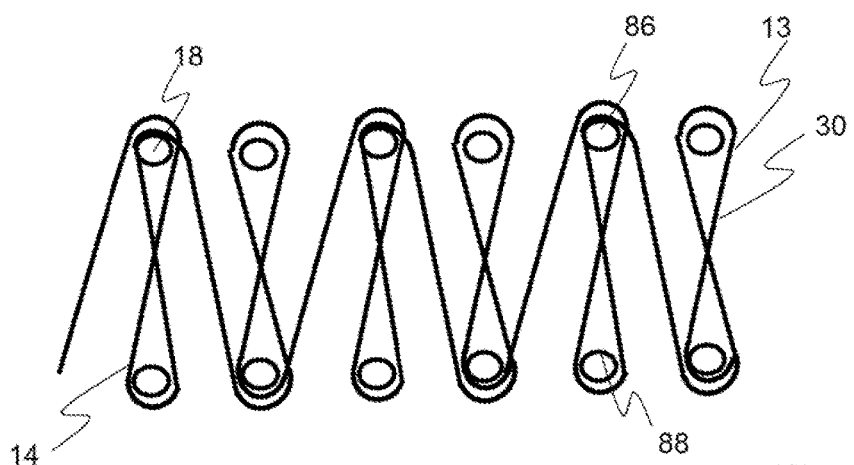
Figure 20B:
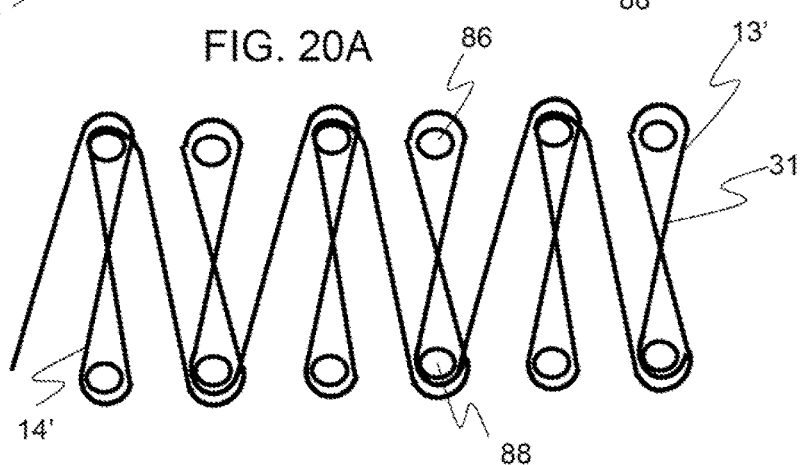

FIG. 20A-20B shows a first strand configured around pegs configured in first and second peg rows and a second strand configured around the pegs in the same wrap configuration as the first strand.

Figure 20C:
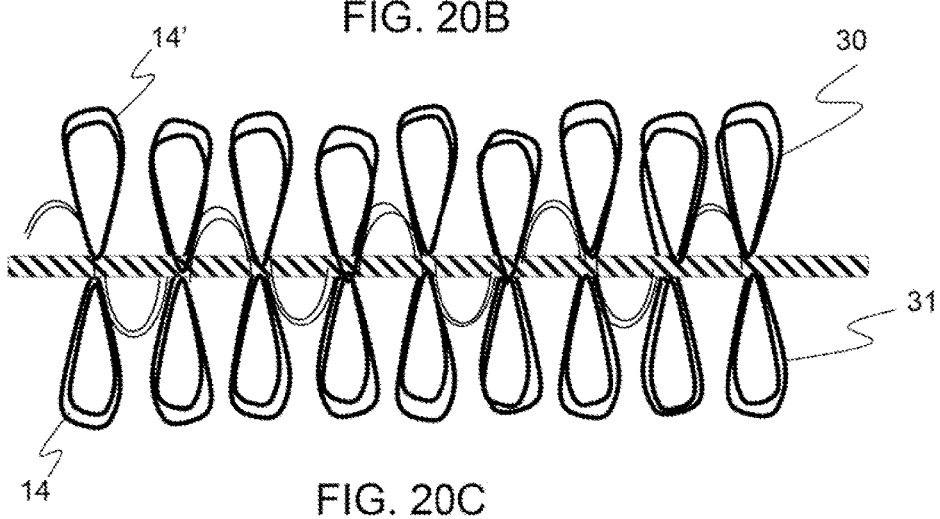

FIG. 20C shows a top-down view of the strands shown in FIGS. 20A and 20B captured in a twisted current collector to form a plurality of double looped strands.

Figure 21:
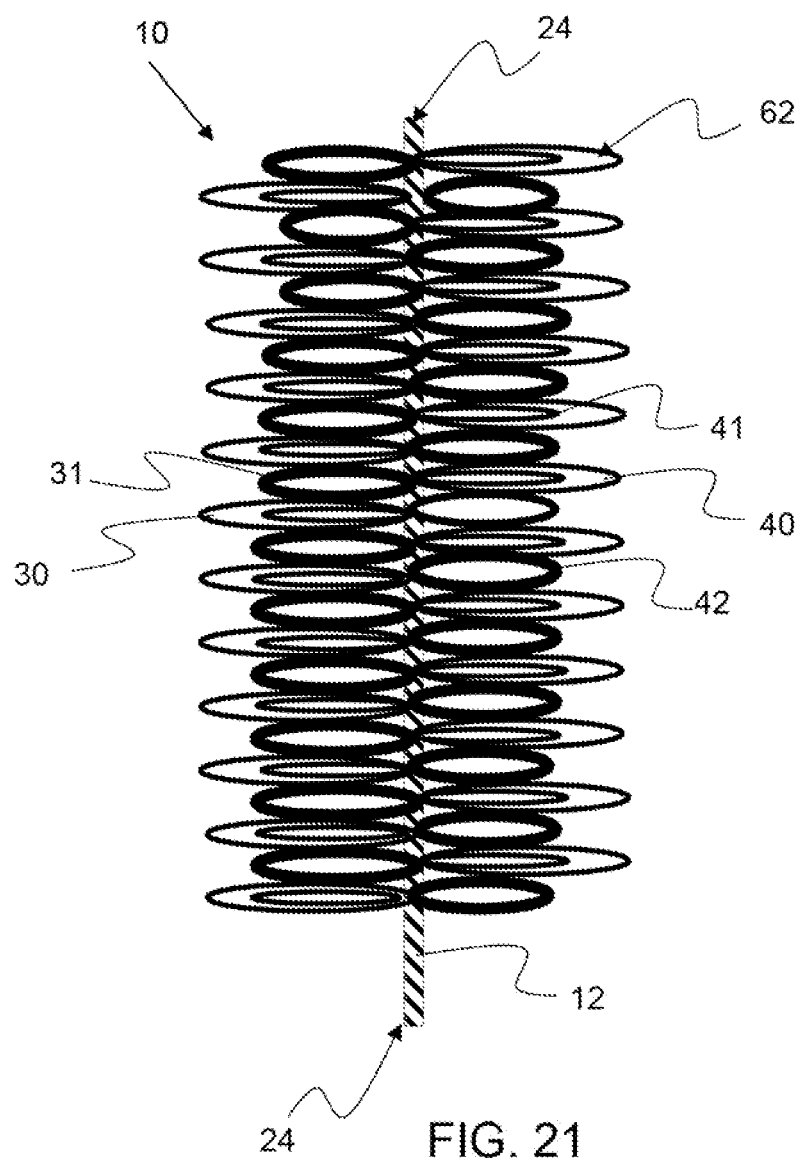

FIG. 21 shows a side view of a multi-looped electrode having integral double looped strands and a second strand forming a third looped strand.

Figure 22A:
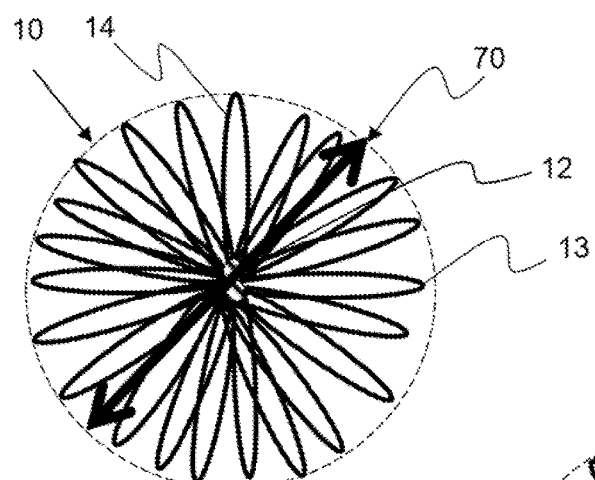

FIG. 22A shows a top-down view of a multi-looped electrode having a plurality of looped strands extending from a current collector.

Figure 22B:
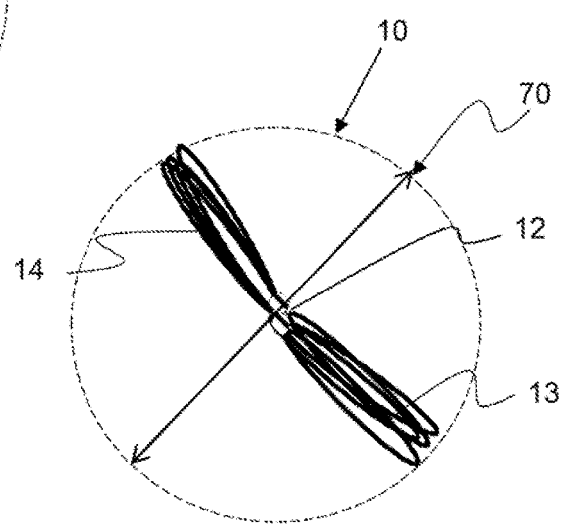

FIG. 22B shows a top-down view of a multi-looped electrode having a plurality of looped strands extending from a current collector whereby the looped strands are compressed into a planar configuration.

Figure 23:
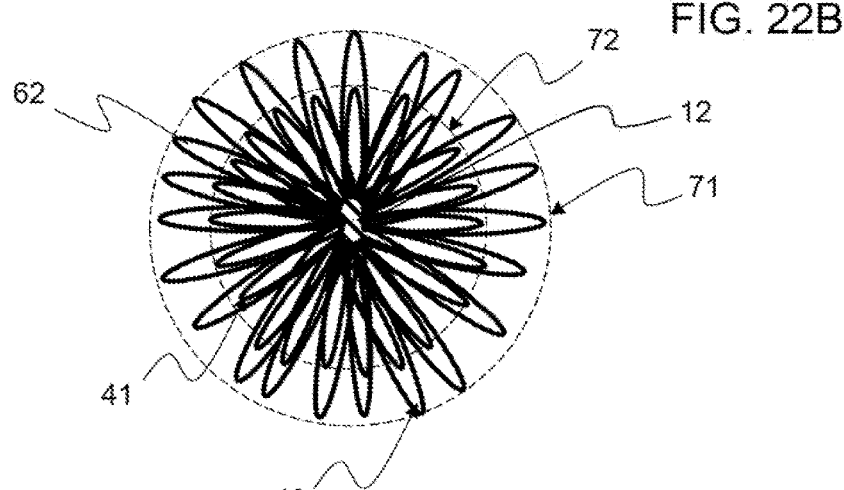

FIG. 23 shows a top-down view of a multi-looped electrode having a plurality of integral double looped strands extending from a current collector.

FIGS. 24A-24G show cross-section representations of strands.

Figure 25:
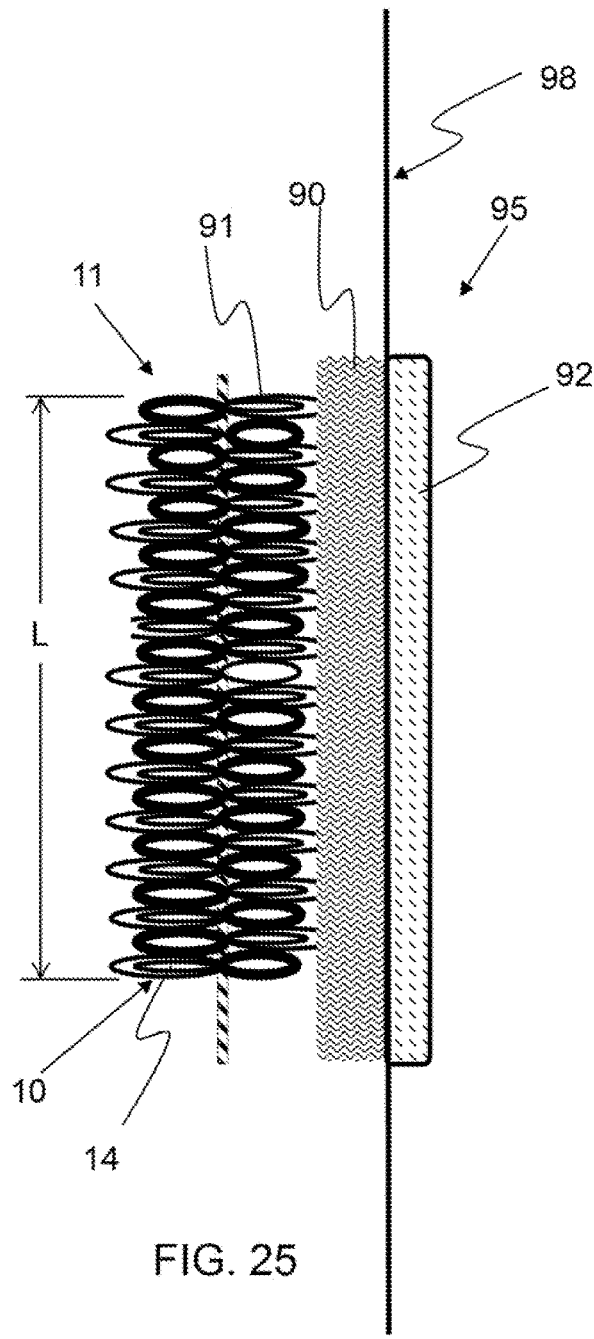

FIG. 25 shows a side view of a multi-looped electrode configured in an electrochemical cell.

Figure 26:
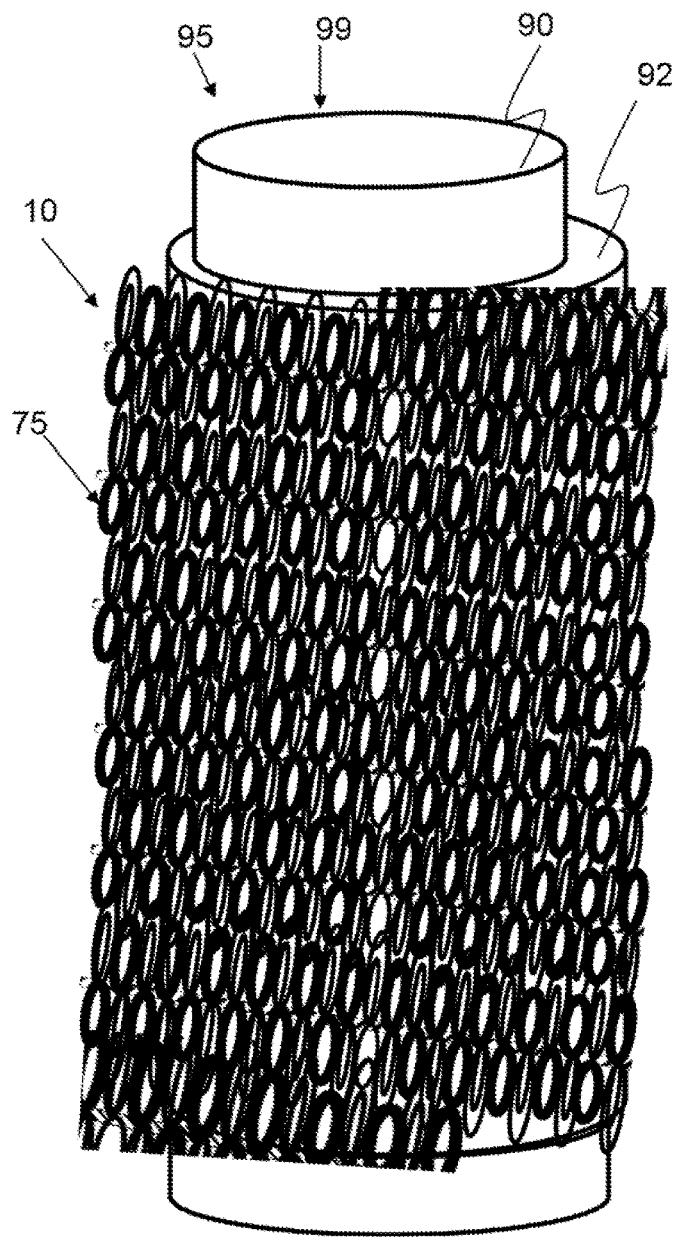

FIG. 26 shows a side view of a multi-looped electrode wrapped in a spiral configuration around an electrochemical cell.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary multi-looped electrode 10 comprises a plurality of looped strands 14 retained in the current collector 12. The looped strands shown in FIG. 1 all have substantially the same length and extend substantially the same distance from the current collector.

As shown in FIG. 2, a portion of an exemplary multi-looped electrode 10 comprises connected strands 15 between the looped strands 14, 14'. The connected strands shown in FIG. 2 have a length less than the length of the looped strands and do not extend as far away from the current collector as the looped strands. Any number of looped and connected strands may be configured along a multi-looped electrode as described herein. As shown in FIG. 2, a connected strand is configured between each looped strand. Alternatively, two or more connected strands may be configured between looped strands.

As shown in FIG. 3, an exemplary looped stand 14 is coupled to a current collector 12 and has a length 44, as shown by the dashed outline of the looped strand. The length 44 is a measure of the length of the strand from the first loop end 46, to the second loop end 48. Both the first and second loop ends are retained by the current collector in substantially the same location. The extended length 43 of the looped electrode, or the distance the looped strand extends from the current collector, may be any suitable distance. The maximum extended length of a looped strand is approximately one-half the looped strand length.

As shown in FIG. 4, an exemplary peg board 17 comprises a strand 13 wrapped around the pegs 18 in a sinusoidal configuration where the strand wraps around a first peg 18 in a first peg row 86 and then extends around a second peg 18' in a second peg row that is offset from the first peg along the length of the peg board 79 or current collector. A peg board may have any number of pegs arranged in any number of rows. The peg rows may be configured at any suitable distance from the peg board centerline 79, as indicated by the dashed line. A current collector 12 is shown being, configured under the wrapped strands.

As shown in FIG. 5, the exemplary peg board 17 of FIG. 4 has the current collector 12 wrapped around a collector peg 81 and extending back over the wrapped strands. The collector peg 81 is configured substantially along the center line 78 between the two rows of the pegs. The collector peg 81 may be rigid and extend up from the peg board, or have a length or specific geometry to effectively retain the current collector as it is being twisted. For example, the collector peg may comprise a ring or bent configuration to prevent the current collector from popping off during twisting. In the configuration shown in FIG. 5, a contiguous current collector 12 is used to form the twisted current collector comprising the first 20 and second 21 current collectors, wherein the first current collector is configured under the wrapped strands 13 and the second current collector is configure over the wrapped strands. Both the first 22 and second 24 ends of the contiguous current collector 12 are configured on one end of the peg board. A contiguous current collector comprises a single current collector strand, such as a single wire, that is not broken or cut.

As shown in FIG. 6, the exemplary peg board 17 of FIG. 4 has a second current collector 21 that is fastened together with the first current collector 20 to form a fastened end 29. The fastened end is configured around the collector peg 81. The first ends 22, 22' of the first 20 and second 22 current collectors are twisted together to form a twisted current collector 28. As the first and second current collectors are twisted the wrapped strands are captured in the twists and retained in the twisted current collector. As shown in FIG. 6, the strand 13 may pull off of the pegs 18, 18' as the strands are captured and retained in the twisted current collector 18, as indicated by the arrows. The pegs 18 may be configured out of flexible material to allow the strands to deflect the peg and pull off as the strand wrapped there around is pulled during the current collector twisting. A peg may comprises an elastomer or plastic, or may comprises a hinged portion that allows the peg to deflect when the tension of a strand wrapped there around is sufficient to deflect the peg. A peg may have any suitable length 83 and diameter.

As shown in FIG. 7, a strand 13 is wrapped in a serpentine fashion around the pegs 18 aligned in first 86 and second 88 rows. The peg distance 82, or distance between two pegs within a peg row, and the row distance 80, or the distance between two peg rows, may be any suitable dimension. In an exemplary embodiment, the peg distance is substantially uniform from peg to peg. In another exemplary embodiment, the peg rows are spaced substantially equal distance from a centerline 78. Pegs may be configured in any suitable way, such as on a peg board or in any other suitable manner. In one embodiment, a peg or peg row is configured to be displaced from one location to another. For example, a peg row may be configured on a discrete board or support and that can be positioned as desired. In one embodiment, two peg row supports are configured with a spacer there between and secured in place.

As shown in FIG. 8, a strand 13 is wrapped in a serpentine fashion around the pegs and a first current collector is configured under the strand and a second current collector is configured over the strand. The offset distance 85, or the distance from the current collector to the outermost part of the peg, is not uniform between the first 86 and second peg rows 88. The current collectors are configured closer to the second peg row 88, thereby making offset distance 85 less than offset distance 85'.

As shown in FIG. 9, a strand 13 is wrapped in a serpentine fashion around pegs and two current collectors are fastened at the second end 24 around collector peg 81. A first 20 and second 21 current collector may be fastened together, such as by being tied together, crimped, welded and the like. A fastener, such as a clamp or other suitable device may also be used to fasten current collectors together. Any number of current collectors strands may be used such as a single contiguous current collector strand, a first and second current collector comprising discrete current collectors strands, two or more current collector strands and the like. For example, a single contiguous current collector strand may be wrapped around a collector peg to provide two current collector strands extending under a wrapped strand, and one or more additional current collector strands may be configured over the wrapped strands. Any number of current collector strands may be fastened together.

Also shown in FIG. 9 are discrete peg boards comprising the first and second peg rows 86, 88 respectively. The discrete peg boards may be fastened in a desired location relative to each other. In addition, peg rows, or discrete peg boards may be configured at an angle to the centerline, thereby creating a variable offset distance along the length of an electrode made therefrom. In an exemplary embodiment, both a first and second peg row are configured with increasing peg offset distances along the length of the assembly, thereby producing an electrode with a flared configuration comprising strands with a shorter length at one end and strands with a longer length at a second end, and a substantially continuous strand length change from a first end and second end.

As shown in FIG. 10, an electrode 11 is formed from twisting the current collects 20, 21 to produce connected strands 15 retained with the twisted current collectors 28.

As shown in FIG. 11, an electrode 11 comprises a plurality of connected strands 15. Connected strands have a first captured end 56 and second captured end 57 that are retained by the twisted current collector 28, such as by being trapped in the twist. The length of the connected strand 54 is the length of the strand from the first captured end to the second captured end.

As shown in FIG. 12, a first strand 30 is wrapped around the set of pegs 18 with a row distance 80 and a second strand 31 is wrapped around a second set of pegs 18' having a smaller row distance 80'. The first strand is wrapped in a sinusoidal configuration around pegs in a first peg row 86 and second peg row 88. The second strand is wrapped in a sinusoidal configuration around pegs in a third peg row 87 and fourth peg row 89. The first stand 30 is different from the second strand 31, as indicated by the different weight lines in FIG. 12. A first strand may be a different composition and/or have different geometry or dimensions. For example, a first strand may comprise carbon fibers and a second strand may comprise metal strands. A first strand may be round and have a first outer diameter and a second strand may be round and have a second outer diameter that is larger than the outer diameter of the first strand.

As shown in FIG. 13, the strands 30, 31 shown in FIG. 12 are captured in a twisted current collector 28. The connected strands are different and have different offset distances 85 and 85'.

As shown in FIG. 14, a single strand 13 is configured around the pegs 18 to form looped strands 14. The wrapping configuration shown produces looped strands around every other peg within a row. The looped strands are configured in an alternating configuration, with a first looped strand 14 around a peg in a first peg row, and second looped strand 14' around a peg in a second peg row. As described herein, looped strands may be configured in any suitable orientation. Looped strands may be configured around each peg in a row, or around every peg.

As shown in FIG. 15, the strands 13 shown in FIG. 14 is captured in a twisted current collector 28 to form a plurality of looped strands 14.

As shown in FIG. 16A, a first strand 30 is configured around the pegs 18 to form looped strands 14. As shown in FIG. 16B, a second strand 31 is configured around the pegs to form looped strands 14' on the opposite pegs as shown in FIG. 16A. The configuration of second strand 31 is shown separate from that of the first strand in 16A for clarity. It is to be understood that the first and second strands are configured around the same pegs, with one strand being wrapped over the second strand.

As shown in FIG. 16C, the strands shown in FIGS. 16A and 16B are captured in a twisted current collector 28 to form a plurality of looped strands 14 and 14'. The looped strands are configured in an opposing configuration with the first looped strand ends terminating in substantially the same location along the twisted current collector.

As shown in FIG. 17, a single strand 13 is configured at least partially around each peg 18 two times. The single strand produces looped strands 14, 14' that are configured around each peg in this configuration. This configuration provides for a high strand density and high strand length density with only a single strand.

As shown in FIG. 18, a multi-looped electrode 10 made by the peg wrapping configuration shown in FIG. 17 comprises an opposing looped strand configuration with looped strands extending from the twisted current collector 28 in substantially the same location along the length of the twisted current collector.

As shown in FIG. 19, a multi-looped electrode has integral double looped strands 61. An integral double looped strand is a plurality of loop strands configured around a single peg from a single strand. The first loop 40 is shown larger than the second loop 41 for clarity only. The integral double looped strands are in an alternating configuration. Any number of looped strands having any offset distance may be configured in a multi-looped electrode however. For example, a peg board may be configured with first, second, third and fourth peg rows as shown in FIG. 12. Looped strands may be configured around each of the pegs shown in FIG. 12 to produce a plurality of looped strands having different offset distances.

As shown in FIG. 20A, a first strand 30 is configured around the pegs 18 in first and second peg rows 86, 88 respectively and as shown in FIG. 20B a second strand 31 is configured around the same pegs 18 in the same wrap configuration as strand 30 to product double looped strands as shown in FIG. 20C. Strand 31 is shown wrapped around the pegs 18 in a separate figure for clarity. It is to be understood that the second strand is wrapped over the first strand. Any number of strands may be wrapped around pegs configured in any number of peg rows. The wrapping configuration of two strands shown in FIG. 20A and FIG. 20B produces double looped strands 60 as shown in FIG. 20C. Double looped strands comprise two loops extending from the twisted current collector that have loop ends that are retained in a twisted current collector in substantially the same location along the length of the twisted current collector.

As shown in FIG. 21, a multi-looped electrode 10 has an integral double looped strands 62 and a second strand 31 forming a third looped strand 41. The second strand is different from the first strand 30 as indicated by the bolder strand line in in FIG. 21. It is to understood that any number of configurations comprising any number of different strands and multi-looped configurations have been contemplated in the present invention, including alternating, opposing, double looped and integral double looped configurations. It is also to be understood that more than two looped strands may be configured around a single peg or around two or more pegs aligned with and on the same side of the current collector, thereby creating triple or quadruple loops, for example. Nesting looped strands of different offset distances may provide a high strand density as described herein.

As shown in FIG. 22A, a multi-looped electrode 10 has a plurality of looped strands 14 extending from a current collector 12. The diameter of the electrode 70, as indicated by the double arrowed line pointing to the circular dashed line around the electrode, may be any suitable diameter. The looped electrodes may extend from the current collector in all directions as shown in FIG. 22A, or may substantially extend in only one or two directions as shown in FIG. 22B. The exemplary electrode shown in FIG. 22A may be compressed to form the electrode as shown in FIG. 22B. This compressed configuration may be desired when assembling an microbial electrochemical cell.

As shown in FIG. 23, a multi-looped electrode 10 has a plurality of integral double looped strands 62 extending from a current collector 12. The integral double looped strand comprises first looped strands 40 having a first looped diameter 71 and second looped strands 41 having a second looped diameter 72. As shown, this configuration of nested looped strands provides for a higher strand density. The looped diameters 71 and 72 may be substantially the same as the relative offset distances of these loops.

Figure 24A:
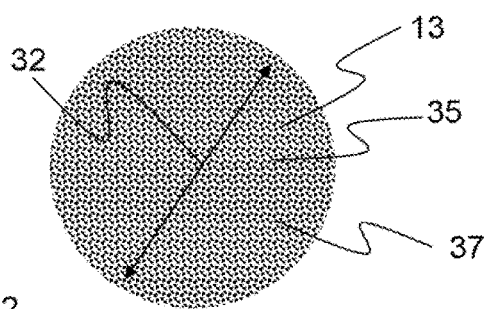
Figure 24D:
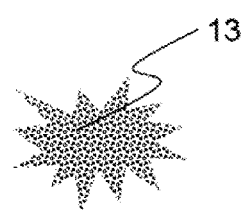
Figure 24B:
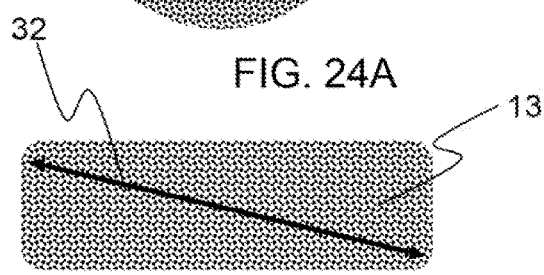
Figure 24E:
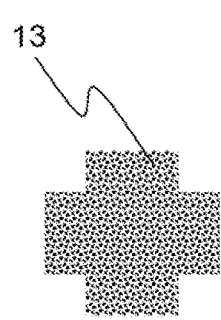
Figure 24C:
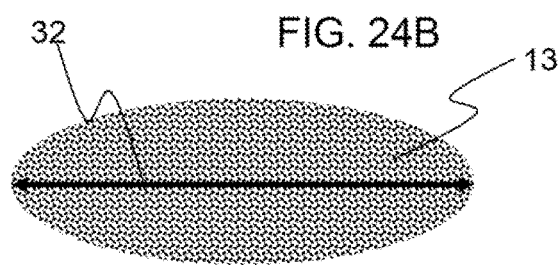
Figure 24F:
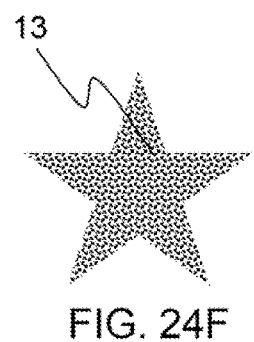
Figure 24G:
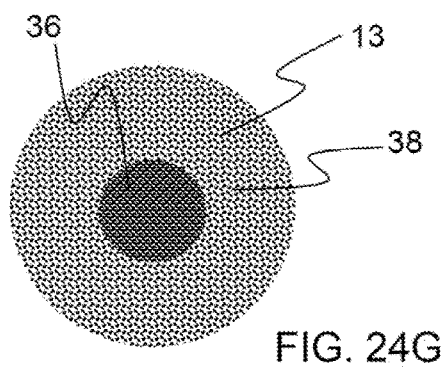

As shown in FIGS. 24A-24G, a strand 13 may have various cross-section shapes, and geometries. For example, FIG. 24A show a strand 13 comprising a plurality of fibers 35, such as carbon fibers, configured in a bundle 37. The maximum cross-sectional dimension 32 of the round strand 13 is shown in FIG. 24A. The maximum cross-section dimension 32 is the maximum linear distance measured across a cross-section of a strand. As shown in FIG. 24B a rectangular shaped strand has a maximum cross-sectional dimension 32. A strand may be a ribbon or tape, whereby the thickness of the strand is substantially less than the width of the strand, whereby the width is at least 6 times the thickness and the thickness is no more than 20 mm. FIG. 24C show a strand 13 having an oval cross-sectional shape. FIG. 24D shows a strand 13 having an irregular cross-sectional shape. FIG. 24E shows a strand 13 having a polygonal cross-section shape. FIG. 24F shows a strand 13 having star shaped cross-section shape comprising a plurality of extension terminating in points. FIG. 24G shows a strand 13 having a round cross-sectional shape and a core 36 configured within an outer strand portion 38. The core may be a different material than the outer strand portion 38 and may have any suitable shape and size. In an exemplary embodiment, a core 36 is a highly electrically conductive material provided to reduce electrical resistance of a electrochemical cell.

As shown in FIG. 25, a multi-looped 10 type electrode 11 is configured as an anode 91 in an electrochemical cell 95 comprising a ion conducting membrane 90, and a cathode 92. The multi-looped electrode may be positioned adjacent to or in contact with the ion conducting membrane and in an exemplary embodiment is pressed against the ion conducting membrane. In an exemplary embodiment, the anode is exposed to a liquid containing biological material that forms a bio-film on the stands of the electrode. A solution comprising ions may be provided to the cathode 92. In addition, a separator 98 may be configured to prevent fluid from the anode from mixing with the cathode.

As shown in FIG. 26, a multi-looped 10 type electrode 11 is wrapped in a spiral configuration around an electrochemical cell 95. The electrochemical cell 95 shown in FIG. 26 is a cylindrical cell 99, wherein an ion conducting membrane 90 is configured into a cylindrical shape and separates that anode from the cathode. A fluid may be passed through the center of the cylinder as required for promoting reaction. It is to be understood that the anode may be configured on the inside or outside of the cylindrically shaped cell. The spirally wound electrode 75 comprises a multi-looped electrode 10 as described herein. The flexibility of the electrodes as described herein, allows for forming an electrode into any suitable shape.

In an exemplary embodiment, an electrode as described herein consists essentially of connected strands having first ends and second ends retained by the current collector, except for strand terminations at the first or second end of the electrode.

In an exemplary embodiment, an electrode, as described herein consists of connected strands having first ends and second ends retained by the current collector.

In an exemplary embodiment, an electrode, as described herein, has a total strand length that consists essentially of looped strands, wherein said looped strands make up at least 75% of the total strand length.

In an exemplary embodiment, an electrode, as described herein, comprises connected strands having first and second connected strand ends retained in different location along the length of the current collector, and looped strands comprising first and second loop ends retained at substantially the same location along the current collector, wherein the looped strand length is at least twice that of the connected strand length.

A connected strand, as used herein, is a strand having a first and second end that is retained by the current collector.

A looped strand, as used herein, is a type of connected strand having a first loop end and second loop end retained by a current collector in substantially the same location on the current collector.

Substantially greater, as used herein in reference to the looped strand length and maximum cross-sectional dimension, means at least 20% greater.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents Example 1

A carbon strand comprising a bundle of 24,000 carbon fibers available from Fibreglast Inc., Brookville, Ohio, had a round cross-section with an outer diameter of 2 mm. A peg board having 100 pegs configured in two parallel rows of 50 pegs with a spacing of approximately 5 mm between pegs in a row was used to make a multi-strand electrode. The peg rows had a row distance of approximately 8 mm, and the pegs were aligned from row to row, as shown in FIG. 17. The pegs were plastic cylinders having an outer diameter of approximately 2 mm and had a length, or extended up from the peg board, approximately 40 mm. A metal current collector made of titanium from McMaster-Carr having a diameter of 0.81 mm, was placed along the center line of the peg board. The strand was wrapped according to the configuration shown in FIG. 7. The current collector was then wrapped around a collector peg and extended back over the wrapped strand. The two free ends of the current collector were twisted together. The current collector was further twisted until the strands were captured in the twisted current collector whereby they were pulled off the pegs.

A multi-strand electrode having the general configuration shown in FIG. 18 was produced having looped and connected strands.

The electrode strand length density was measured by cutting a section of the multi-strand electrode that was 1 cm long. The strands were removed over this length and weighed. The weight was divided by the weight per unit length of the strand material to determine the approximate length of strand material captured in the 1 cm long section of electrode. The removed strand weight was 0.767 g, and the weight of strand per cm was determined to be 15.6 mg/cm. The approximate strand length was 49 cm and the strand length density was 49 cm/cm.

What is claimed:
1. A method of manufacturing a multi-strand electrode comprising the steps of:

a. providing at least one current collector having a collector length;
b. providing a first strand;
c. providing a peg assembly comprising:
   i. a plurality of flexible pegs configured in first and second rows having a row separation space there between;
d. placing a first current collector between the two rows of pegs;
e. wrapping the first strand around the pegs whereby the first strand wraps around a peg on a first row and then extends across the separation space to wrap around a second peg on a second row;
f. placing a second current collector on-top of the wrapped first strand; and
g. twisting the first and second current collectors together to form a twisted current collector, whereby said first strand is retained in the twisted current collectors and pulls off the flexible pegs as the current collectors are twisted together to produce a multi-strand electrode having a plurality of connected strands extending from the twisted current collector.

2. The method of manufacturing a multi-strand electrode of claim 1, wherein the multi-strand electrode comprises looped strands, whereby the first strand is wrapped around the pegs such that the first strand crosses over itself in the separation space between pegs in the first and second rows and whereby the first stand forms a looped strand that extends from the twisted current collector and comprises
   i. a first looped end; and
   ii. a second looped end;
wherein said first looped end and said second looped end are retained by said current collector in the multi-strand electrode.

3. The method of manufacturing a multi-strand electrode of claim 1, wherein the first strand is wrapped around a portion of a peg at least twice to form a double looped strand.

* * * * *